United States Patent Office 2,976,203
Patented Mar. 21, 1961

2,976,203
ADHESIVE COMPOSITION, METHODS OF EMPLOYING IT, AND LAMINATED STRUCTURES
Harold C. Young and Walter W. Toy, Philadelphia, Pa., assignors to Rohm & Haas Company, Philadelphia, Pa., a corporation of Delaware
No Drawing. Filed Sept. 6, 1957, Ser. No. 682,306
12 Claims. (Cl. 154—140)

The present invention is concerned with the production of adhesive compositions of aqueous character adapted to be applied either as a contact cement or a pressure cement. By contact cement is meant a cement which has the capacity to bond two substrates well enough on initial assembly to hold the assembly together without employing clamp pressure. The invention is also concerned with laminated structures comprising a layer adapted to be employed as a coating or covering layer, which layer carries an adhesive composition of the present invention on one surface thereof, such adhesive layer being protected by a suitable sheet or film adapted to be stripped from the structure at the time the first-named layer is to be applied to a surface to be decorated. Such structures include wall tiles, wallpapers, as well as floor coverings and ceiling boards. The present invention is also concerned with methods of employing the adhesive compositions of the present invention.

It is already known to employ as adhesive compositions various aqueous solutions of proteinaceous materials such as glues. Such systems, however, are generally susceptible to moisture so that inadequate moisture-resistance is obtained in the adhered structures. It is known to employ solutions of esters of an acrylic acid in an organic solvent or to use such esters in the form of hot-melts. The employment of such solutions has the disadvantages of flammability or toxicity because of the organic solvent and they are usually ill adapted to employment with plastic films or sheets because of the swelling or solvation which the solvent exerts on the surface of the film or sheet to be joined. There have been suggestions in the past to employ aqueous dispersions of rubber or synthetic polymers, such as those of styrene, vinyl chloride, vinyl acetate, or the like, but it has been necessary when such materials have been employed to use heat or to employ a substantial amount of a plasticizer in order to effect proper coalescence of the adhesive. The presence of a plasticizer has the disadvantage that it is subject to migration or loss on aging of the adhered structure and such a loss is accompanied by embrittlement which may frequently result in rupture of the adhesive bond as well as the disadvantageous loss in flexibility which may be important when certain substrates are involved.

The usual contact cement commercially available at the present time is a rubber-base cement in which the rubber is dissolved in an organic solvent. It requires that both surfaces to be adhered be coated with the cement. It requires that the coated surfaces be allowed to dry in the air for at least 20 minutes before the two substrates are assembled. In addition, extreme care must be taken that the surfaces are placed together in accurate registry at the first instant of contact since the members adhered together cannot be shifted after such contact. In addition, the rubber-base cements are subject to hardening as a result of oxidation.

It is an object of the present invention to provide an improved aqueous adhesive composition which is adapted to be employed either as a contact adhesive or as a pressure adhesive, i.e., a pressure-sensitive adhesive, especially one showing good low-pressure bonding adhesive properties. Another object is to provide an aqueous cement which is of such character that porous surfaces coated therewith may be immediately assembled together while the coatings thereon are still wet. Another object of the invention is to provide an aqueous adhesive which is of such a character that coatings thereof on the substrates to be adhered may be allowed to undergo substantial drying effect but are not required to do so before the substrates are adhered, good results being obtained in either manner of operation. Another object of the invention is to provide an aqueous adhesive which is of such character that sufficient tackiness is obtained between surfaces coated therewith immediately after the coating to enable the substrates to be assembled without the need for clamps to retain the substrates in position during setting of the adhesive. Another object of the invention is to provide an aqueous adhesive composition which is of such character that for a substantial period of time after assembly, whether such assembly is performed while the adhesive is dry or wet, the substrates assembled can be shifted or completely separated and then reassembled without serious loss in the final strength of the adhesive bond obtained. Another object of the invention is to provide an aqueous adhesive which is of such character as to remain permanently flexible and which is not subject to hardening by oxidation. Other objects and advantages will appear from the description hereinafter.

The adhesive composition of the present invention is an aqueous dispersion of a water-insoluble copolymer of 2 to 4% by weight of a polyfunctional acid, such as itaconic acid, fumaric acid, and the dimer of methacrylic acid, 5 to 25% by weight of methyl methacrylate or acrylonitrile (or mixtures thereof), and the balance of one or more esters of acrylic acid with an alcohol having from 1 to 18 carbon atoms and water-insoluble salts thereof. The composition may have a pH of about 2.5 to about 7 or higher but preferably the pH is between 5 and 6.6. Proportions of the several components of the copolymer are such as to provide a $T_i$ between $-15°$ C. and $+15°$ C. and, for optimum cohesive strength in conjunction with low-pressure bonding adhesion, the preferred $T_i$ is between $-5°$ C. and $+5°$ C.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is the temperature at which the modulus of rigidity is 300 kg./cm.$^2$.

An essential characteristic of the copolymer is that it be of a molecular weight in the range of 50,000 to 250,000 viscosity average. Preferably the molecular weight is from 80,000 to 175,000. The low range of molecular weight is obtained by the employment of a chain regulator in an emulsion polymerization procedure as described in more detail hereinafter. The amount of chain regulator may vary, depending upon the particular regulator and the particular conditions of polymerization, but in general from 0.2 to 5% and preferably 0.2 to 1.5% by weight of such chain regulator is employed, such percentage based on the total weight of monomers.

The salt of the copolymer may be that obtained by the use of ammonia, an alkali metal, such as sodium or potassium, or a water-soluble amine such as a lower aliphatic amine of which triethylamine, diethylamine, and trimethylamine are representative, morpholine, monoethanolamine, diethanolamine, or triethanolamine. Preferably ammonia or a volatile amine is employed as the cation of the salt of the acid copolymer.

The presence of the methyl methacrylate, acrylonitrile, or a mixture thereof is essential. However, it is important that the amount of these monomers employed be kept within the range specified. A minimum of about 5% is generally necessary to get sufficient rigidity in the adhesive to hold the adhesive coating in place in the final adhered structure. If insufficient of this component is employed, there is inadequate resistance to tearing within the adhesive layer itself. In other words, this component is needed to give the necessary cohesive strength in the adhered structure. The upper limit of this component depends upon the content of the acid and the particular acrylate employed. At the lower limit of 2% of acid, 25% by weight of this component may be employed; but as the acid content is increased to 4%, the maximum content of this component that is permissible gradually decreases until a value of about 5% by weight thereof is reached when the acid content reaches 4%. When the third or acrylic acid ester component is ethyl acrylate or methyl acrylate or mixtures thereof, the amount of methyl methacrylate or acrylonitrile should not exceed 15% whereas with the higher alcohol acrylates, such as butyl acrylate, the amount of methyl methacrylate or acrylonitrile may be as high as 25%.

The acid component is needed to provide specific adhesion to a wide variety of substrates and especially to those of hydrophilic or metallic character.

The particular ester of acrylic acid that is employed may be chosen from a wide group including methyl acrylate, ethyl acrylate, butyl acrylate, cyclohexyl acrylate, 2-ethylhexyl acrylate, t-octyl acrylate, dodecyl acrylate, and octadecyl acrylate. Preferably, the copolymers are made from methyl acrylate, ethyl acrylate, or butyl acrylate, because of the availability and inexpensiveness of those monomers.

The copolymer dispersions may be made by first mixing the several monomers and the chain-regulator in the desired proportions into an aqueous solution of an anionic or a non-ionic dispersing or emulsifying agent, or a mixture of both types.

Examples of anionic emulsifying agents that may be used include the higher fatty alcohol sulfates, such as sodium lauryl sulfate, the alkylaryl sulfonates, such as the sodium salt of t-octylphenyl sulfonate, the sodium dioctyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of 6 to 15 carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophobic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01 to 1.0%, based on the weight of the monomers, of the peroxidic agent and the same or lower proportions of the reducing agent are recommended. In this way it is possible to prepare dispensions which contain as little as 1% and as much as 60% or 70% of the resinous copolymer on a weight basis. It is, however, more practical—hence preferred—to produce dispersions which contain about 30 to 50% resin-solids.

In the polymerization process the greater the proportion of chain regulator used the lower the molecular weight obtained. Examples of chain regulators which may be used include long-chain alkyl mercaptans, e.g., t-dodecyl mercaptan, isopropanol, isobutanol, long-chain alcohols, e.g., lauryl alcohol, t-octyl alcohol, $CCl_4$, $C_2Cl_4$, and $CBrCl_3$.

The unmodified or unfilled composition may contain 30 to 55% water and at least 30% of the copolymer or salt thereof. For optimum results, however, the composition comprises about 50 to 60% water and about 40 to 50% of the copolymer or salt thereof.

After the polymerization, in the event the itaconic or other acid is employed therein as a free acid, neutralization of the dispersed copolymer is obtained by the addition of concentrated ammonia, one of the amines mentioned hereinabove, or the hydroxide or carbonate of sodium, potassium, or lithium. If desired, further adjustment of the concentration may be effected by diluting the neutralized dispersion with water. When a filler is employed, as described hereinbelow, the adjustment of the concentration may be effected after the incorporation of the filler instead of before if desired.

In the compositions of the present invention, a filler may be employed in an amount ranging up to 125% by weight of the polymer in the aqueous dispersion. The filler increases the tensile strength of the adhesive film obtained from the polymer and it reduces the cold flow or creep thereof. This effect, which may be referred to as a reinforcing effect, is definitely noticeable even when as small an amount as 12% of filler, based on the weight of the polymer, is employed. The maximum reinforcing effect is obtained when the filler is used in greater amounts up to 125% of the polymer weight, the maximum depending upon the particular filler employed. The filler affects the allowable drying time of the adhesive composition. Thus, when no filler is employed, a period of 45 minutes may be allowed before the substrates coated with the adhesive are assembled. When the maximum amount of filler mentioned is employed, this permissible drying time may be reduced to 5 or 10 minutes depending upon the particular composition. In either case, whether no filler is employed or maximum filler is employed, wet assembly is possible and tackiness is present in sufficient amount so that no clamping is needed even when the freshly coated surfaces are immediately placed in contact if one surface is porous. Furthermore, whether or not a filler is present, the adhered surfaces can be separated within an hour's time of initial assembly and readjusted or recontacted to provide more accurate positioning without serious sacrifice in bond strength.

The fillers preferably have a particle size not over 40 microns and in optimum cases their dimensions are 10 microns or less. Many types of fillers may be employed. One of the best is rutile titanium dioxide. Others such as anastase titanium dioxide, lithopone, magnesium silicate, clay, wollastinite, zinc oxide, calcium carbonate, clays including kaolin and bentonite, walnut shell, and so on, are useful. To some extent fibrous fillers such as cellulosic fibers or nylon staple may be employed.

The filler may simply be added directly to the copolymer dispersion with suitable agitation. The dispersion frequently contains adequate emulsifying agent to disperse the filler as well but, if desired, additional dispersing agents may be employed. For this purpose, any of the anionic or non-ionic dispersing agents mentioned hereinabove in the preparation of the emulsion copolymer may be employed. Besides those mentioned hereinabove, there may be used as dispersing agents the alkali metal or ammonium salts of copolymers of maleic acid or maleic acid anhydride with styrene, diisobutylene, or tripropylene, having low molecular weights from about 200 to 5,000. Besides the simple ammonium salts of the latter copolymers, there may be employed the ammonium salts of the half-amide of the copolymers. As much as ¼ to 1% of additional dispersing agent may be employed, based on the weight of filler to be introduced.

It is a characteristic of the low molecular weight polymers of the present invention that when unfilled compositions thereof are dried they retain tackiness and possess what may be termed "dry-grab." Surprisingly, the copolymers of the present invention retain this drygrab even in the presence of 125% by weight, on the weight of the polymer, of a filler.

There may be added to the adhesive composition to improve the viscosity and flow properties thereof from ¼ to 1% by weight, based on the total solids of the composition, of a thickening agent. The amount of such thickening agent, when used, is generally selected to provide a viscosity in the composition of about ½ poise to about 100 poises. In most cases, when a viscosity in the lower part of the range is desired in the particular application, no thickener is necessary. Examples of thickening agents include natural gums, such as gum tragacanth and gum arabic, polyvinyl alcohol, hydrolyzed polyacrylonitrile, polymers of acrylic acid and methacrylic acid, water-soluble cellulose ethers, such as methyl cellulose, ethyl cellulose, hydroxyethyl cellulose, carboxymethyl cellulose, and the like.

The adhesive compositions may be applied in various ways. For example, they may be applied by brush, roller, trowel, knife, spraying, and so on. It is preferable that the adhesive be applied to both surfaces to be adhered together when they are both impervious and then to allow the coatings to dry in the air such as for a period of five minutes as a matter of convenience. However, if one surface is porous, it may be preferred to coat only the impervious surface to allow greater assembly time. When both surfaces are porous, the cement may be applied to both and then contacted very quickly thereafter.

The strength of bond develops sufficiently in the first 15 minutes to hold the substrates together. As the filler content increases, the bond strength develops more rapidly. If the amount of filler is such as to allow only five minutes open-assembly time, greater strength is obtained in one hour after contact than if lower filler content is used. In general, wet assembly favors higher ultimate strength. However, faster development of bond strength occurs when an open-assembly procedure is employed; that is, a certain period of drying is permitted before assembling.

The adhesive of the present invention has been found to provide exceptionally good bonds with numerous substrates, including wood, paper, Formica, other plastic materials such as methyl methacrylate, polyvinyl chloride, saran, polyethylene glycol terephthalate, nylon, phenolformaldehyde resins, urea-formaldehyde resins, and other thermoset materials such as melamine-formaldehyde resins; rayon, cotton, silk, wool, fibers of the polymeric materials mentioned above, leather, linoleum, asphalt tile, vinyl tile, ceramic tile, various silicates such as glass, mineral wool, asbestos, concrete, asbestos cement, plaster, metals such as aluminum, steel, iron, copper, zinc, chromium, nickel, as well as painted or enamelled surfaces, such as painted automobile bodies, woodwork, walls, ceilings, or floors.

Pre-cemented articles such as tapes, wallpapers, or tiles for decorating walls, floors, or ceilings may be produced in which the member to be ultimately applied to a surface to be decorated, such as a tape, wallpaper, or tile is provided on its back surface with a layer of the composition of the present invention and a protective backing is applied over the adhesive layer and is adapted to be stripped therefrom at the time the member is to be applied to the surface it is ultimately intended for. The protective layer may be a thin film of polyethylene or other material which can be stripped more or less readily from the adhesive layer. It is characteristic of the adhesive composition of the present invention that, during the operation of stripping the protective backing film from the adhesive layer, "legginess" is developed in the adhesive, thereby providing a fresh, tacky surface adapted to grab on the surface of the wall, ceiling, or other member to which the tape, wallpaper, or tile is to be applied. Besides tape, wallpaper, and tile, this technique may be used in connection with plastic films, wood veneer layers, or thin sheets of resin or plastic material such as sheets of Formica or vinyl resin; and such films or sheets may be of any size adapted to be cut to ultimate size in the finishing of tables, counters, desks, or other furniture.

The adhesive composition may be colored or substantially colorless. Besides depending on the color of fillers mentioned above, suitable colored pigments may be added in place of, or in addition to, the fillers. Also, if desired, direct dyes may be introduced to provide a desired color.

In the following examples, which are illustrative of the invention, the parts and percentages are by weight unless otherwise noted.

*Example 1*

An aqueous dispersion of a polymer is prepared by the emulsion copolymerization of a mixture of 87 parts of ethyl acrylate, 10.5 parts of methyl methacrylate, 2.5 parts by weight of itaconic acid, and 0.5 part of bromotrichloromethane in about 100 parts of water in the presence of 6 parts of a t-octylphenoxypolyethoxyethylene containing about 30 oxyethylene units, 0.2 part of ammonium persulfate, and 0.25 part of sodium hydrosulfite. After polymerization, potassium hydroxide was added to adjust the composition to a pH of 6 and the dispersion was then diluted to 30% solids concentration. The copolymer had a viscosity average molecular weight of 170,000 and a $T_i$ of $-4°$ C.

A pigment grade of rutile $TiO_2$ was mixed into the polymer dispersion to provide a composition containing 30% pigment concentration by weight of polymer solids. The resulting adhesive composition was applied to one face of several Formica (melamineformaldehyde resin) sheets (10 inches by 10 inches) and to one face of each of several Douglas fir, birch, and other plywood panels (10 inches by 10 inches). A Formica sheet was applied to one of the plywood panels immediately after coating. There was sufficient grab even at this wet stage to allow moderate handling of the assembly without causing the members to slide or fall apart. The sheet and panel were readily adjusted in position after being brought into contact.

Another sheet was applied to another panel about five minutes after coating and still another assembly of a sheet and a panel was made 10 minutes after coating. In both cases strong dry-grab was noted but adjustment of relative positioning of the sheet and panel after contact was made without any noticeable loss in adherence after final positioning.

In all cases, the bonds obtained were found to be fair to excellent when tested one day later and good to excellent when tested seven days later.

Similar results are obtained when neutralization by potassium hydroxide is omitted leaving the dispersion at a pH of about 2.5. When neutralization is effected by ammonium hydroxide or sodium hydroxide instead of potassium hydroxide, essentially the same adhesive qualities are obtained.

*Example 2*

The procedure of Example 1 is repeated except that the concentration of $TiO_2$ was raised to 120% by weight of polymer solids. Excellent adhesion was obtained.

*Example 3*

The adhesives of Examples 1 and 2 were applied in similar manner to adhere a 10-mil thick vinyl film to birch and Douglas fir plywood with good results. A commercially-available rubber-in-organic solvent contact cement gave poor results, softening and curling the vinyl film.

The 120% $TiO_2$ composition was applied to aluminum foil. When an uncoated plywood panel was applied immediately after coating the aluminum foil, an adhesive bond of fairly strong character was obtained whereas a poor bond was obtained when a conventional contact cement formed of rubber in organic solvent was used with a 20-minute air-drying period before contact as recommended by the manufacturer. When the 120% $TiO_2$ composition of the present invention was applied to the surface of the aluminum foil and to the plywood as well and the two coated members assembled after five minutes, a bond of good to excellent strength was obtained whereas the conventional rubber contact cement mentioned gave only a poor bond under these circumstances even when a 20-minute air-drying period was used.

The 120% $TiO_2$ composition of Example 2 and the polymer dispersion of Example 1 (without $TiO_2$) were applied to the surface of several sheets of poly(methyl methacrylate). The coated sheets were assembled after five minutes air-drying and bonds were obtained having a strength of 80 lbs. per square inch tensile strength. The bond strength was as good as that obtained from the above-mentioned rubber contact cement even when the latter is given a 20-minute air-drying before contact.

When the 30% $TiO_2$ composition of Example 1 was applied to the surfaces of two Mylar sheets (polyethylene glycol terephthalate) and assembled after five minutes air-drying, good bonds were obtained. The strength of the bond was adequate for most purposes but was further enhanced by heating the assembly 15 seconds at 225° F. The strength is better than can be obtained in similar fashion from the conventional rubber contact cement even when given a 20-minute air-drying before contact.

When the 120% $TiO_2$ composition of Example 2 was applied to the surfaces of polyethylene sheets which were then assembled five minutes later, fair bond strengths were obtained. The strength of the adhesive bond was as good as that obtained from the above-mentioned rubber contact cement even when the latter is given a 20-minute air-drying before contact of the coated sheets.

*Example 4*

Example 1 is repeated substituting for the $TiO_2$ 30% and 80%, by weight of polymer solids, respectively, of each of the following fillers: magnesium silicate, lithopone, ground walnut shell, kaolin, and nylon staple, e.g., ⅛ to ¼ inch. Similar adhesiveness is obtained in each case.

*Example 5*

Example 1 is repeated using a polymer dispersion obtained from a mixture as there described except that the itaconic acid was replaced by 2.5 parts of fumaric acid and no $TiO_2$ was added. The product shows good low-pressure bonding adhesive properties especially on plywood panels.

*Example 6*

Example 1 is repeated except that no titanium dioxide was used, using a polymer dispersion obtained from a mixture as described in Example 1 except that the itaconic acid was replaced by the dimer of methacrylic acid. The product obtained shows good low-pressure bonding adhesive properties, especially on various plywood panels.

*Example 7*

Example 1 is repeated except that the 10.5 parts of methyl methacrylate are replaced with 10.5 parts of acrylonitrile and no titanium dioxide is added. Good low-pressure bonding properties are exhibited especially when the product is applied to plywood panels.

*Example 8*

The procedure of Example 1 is repeated, but without the addition of titanium dioxide, using a polymer dispersion obtained from a mixture as defined in Example 1 except that the 3 monomers are replaced with 75 parts of butyl acrylate, 22 parts of methyl methacrylate, and 3 parts of the dimer of methacrylic acid. The product shows good low-pressure bonding adhesive properties especially on the plywood panels.

*Example 9*

The unmodified (that is, no $TiO_2$ added) aqueous dispersion of the polymer employed in Example 1 is applied to the finished surface of a leather sheet and also to a Mylar sheet. The coated surfaces are permitted a 20-minute air-drying and then placed in contact with each other. A hand-roller is run over the surface of the Mylar to insure complete and adequate contact. The bond exhibited failure by rupture of the leather surface when tested by peeling off the Mylar cover sheet.

When the above substrates are coated, as above, but oven drying is employed at 200° F. to 250° F., for a period of two minutes, and the coated substrates immediately mated on removal from the oven, an excellent bond is also obtained.

Polyurethane foams are successfully bonded to themselves by air-drying the aqueous dispersion on the mating surfaces, and contacting the coated surfaces when the adhesive coatings are dry to the touch.

*Example 10*

The aqueous emulsion adhesive polymer described in Example 1 is employed in the preparation of paper pressure-sensitive tapes. The unfilled emulsion is spread on one side of the paper (kraft type) and immediately covered, while wet, with a similarly dimensioned polyethylene film. The polyethylene film is removable after one month, and the adhesive side of the paper tape is then placed on another sheet of paper yielding a bond of excellent adhesion. Similarly, adhesive-backed paper exhibits excellent bonds to painted metal walls.

The unmodified emulsion performed equally as well in the above application when both the paper tape and polyethylene film are coated and permitted 5- and 10-minute open-assembly times before mating.

When titanium dioxide filler, to the amount of 120% on the basis of weight of copolymer solids, is employed in the dispersion as above, the resulting paper tapes exhibit excellent pressure-sensitive adhesion to paper and painted surfaces after stripping away the polyethylene film backing.

*Example 11*

The aqueous emulsion copolymer adhesive described in Example 1 employed with titanium dioxide filler at 120% concentration by weight on polymer solids bonds both asphalt tile and vinyl tile to wood substrates (birch, Douglas fir plywoods) under the immediate and also delayed assembly conditions described in Example 1.

The adhesive compositions of the present invention are characterized by lack of organic solvents and accompanying flammability and toxicity. They allow a wide versatility of manipulation of the materials to be adhered. They avoid immediate fixation on contact to such an extent as to interfere with proper adjustment of the substrates being joined while nevertheless providing adherence between the substrates so that clamps are unnecessary. They provide good adhesive strength and are adapted to bond a wider variety of substrates than conventional rubber cements. Since they are aqueous they can be used on substrates, such as plastic films, which would be deleteriously affected by solvents. The compositions of the present invention are of permanently flexible character and are of such character as to provide legginess or "re-tack" even after several hours of setting so that separation of the parts may be effected in this time without interfering with an ultimately good bond on recontact of the surfaces.

It is to be understood that changes and variations may be made without departing from the spirit and scope of the invention as defined by the appended claims.

We claim:

1. An aqueous adhesive composition comprising an aqueous dispersion of polymeric substance selected from the group consisting of a water-insoluble linear copolymer, and salts thereof, of about 2 to 4% by weight of an acid selected from the group consisting of itaconic acid, fumaric acid, and the dimer of methacrylic acid, about 5 to 25% by weight of a member selected from the group consisting of methyl methacrylate and acrylonitrile, and the balance of at least one ester of acrylic acid with an alcohol having 1 to 18 carbon atoms, the copolymer having a $T_1$ between $-15°$ C. and $+15°$ C. and a viscosity average molecular weight between 50,000 and 250,000, the salt being selected from the group consisting of those of ammonium, alkali metals, and those formed with a water-soluble amine, the dispersion containing 30 to 55% by weight of water and at least 30% by weight of the copolymer.

2. A composition as defined in claim 1 which comprises up to 125% by weight, based on the weight of copolymer salt, of a filler.

3. An aqueous adhesive composition comprising an aqueous dispersion of a water-insoluble salt of a linear copolymer of 2 to 4% by weight of itaconic acid, 5 to 25% by weight of methyl methacrylate, and ethyl acrylate, the copolymer having a $T_1$ between $-15°$ C. and $+15°$ C. and a viscosity average molecular weight between 50,000 and 250,000 and the salt being that of a member selected from the group consisting of ammonium, sodium, and potassium, the dispersion containing 30 to 55% by weight of water, at least 30% by weight of the copolymer salt, said proportions of water and salt being based on the total weight of the composition except for fillers and pigments that may be present, and up to 125% by weight, based on the weight of copolymer salt, of a filler.

4. A composition as defined in claim 3 in which the filler is rutile $TiO_2$.

5. A composition as defined in claim 3 in which the filler is calcium carbonate.

6. A composition as defined in claim 3 in which the filler is walnut shell.

7. A composition as defined in claim 3 in which the filler is zinc oxide.

8. A composition as defined in claim 3 in which the filler is lithopone.

9. An aqueous adhesive composition comprising an aqueous dispersion of a water-insoluble salt of a linear copolymer of 2 to 4% by weight of fumaric acid, 5 to 25% by weight of methyl methacrylate, and ethyl acrylate, the copolymer having a $T_1$ between $-15°$ C. and $+15°$ C. and a viscosity average molecular weight between 50,000 and 250,000 and the salt being that of a member selected from the group consisting of ammonium, sodium, and potassium, the dispersion containing 3 to 55% by weight of water, at least 30% by weight of the copolymer salt, said proportions of water and salt being based on the total weight of the composition except for fillers and pigments that may be present, and up to 125% by weight, based on the weight of copolymer salt, of a filler.

10. An aqueous adhesive composition comprising an aqueous dispersion of a water-insoluble salt of a linear copolymer of 2 to 4% by weight of the dimer of methacrylic acid, 5 to 25% by weight of methyl methacrylate, and ethyl acrylate, the copolymer having a $T_1$ between $-15°$ C. and $+15°$ C. and a viscosity average molecular weight between 50,000 and 250,000 and the salt being that of a member selected from the group consisting of ammonium, sodium, and potassium, the dispersion containing 30 to 55% by weight of water, at least 30% by weight of the copolymer salt, said proportions of water and salt being based on the total weight of the composition except for fillers and pigments that may be present, and up to 125% by weight, based on the weight of copolymer salt, of a filler.

11. An aqueous adhesive composition comprising an aqueous dispersion of a water-insoluble salt of a linear copolymer of 2 to 4% by weight of itaconic acid, 5 to 25% by weight of methyl methacrylate, and methyl acrylate, the copolymer having a $T_1$ between $-15°$ C. and $+15°$ C. and a viscosity average molecular weight between 50,000 and 250,000 and the salt being that of a member selected from the group consisting of ammonium, sodium, and potassium, the dispersion containing 30 to 55% by weight of water, at least 30% by weight of the copolymer salt, said proportions of water and salt being based on the total weight of the composition except for fillers and pigments that may be present, and up to 125% by weight, based on the weight of copolymer salt, of a filler.

12. An aqueous adhesive composition comprising an aqueous dispersion of a water-insoluble salt of a linear copolymer of 2 to 4% by weight of itaconic acid, 5 to 25% by weight of methyl methacrylate, and butyl acrylate, the copolymer having a $T_1$ between $-15°$ C. and $+15°$ C. and a viscosity average molecular weight between 50,000 and 250,000 and the salt being that of a member selected from the group consisting of ammonium, sodium, and potassium, the dispersion containing 30 to 55% by weight of water, at least 30% by weight of the copolymer salt, said proportions of water and salt being based on the total weight of the composition except for fillers and pigments that may be present, and up to 125% by weight, based on the weight of copolymer salt, of a filler.

References Cited in the file of this patent

UNITED STATES PATENTS

| Number | Name | Date |
|---|---|---|
| 1,627,278 | Dewey | May 3, 1927 |
| 1,990,701 | Knight | Feb. 12, 1935 |
| 2,279,881 | D'Alelio | Apr. 14, 1942 |
| 2,346,036 | Leary | Apr. 4, 1944 |
| 2,444,094 | Duggan | June 29, 1948 |
| 2,534,108 | de Nie et al. | Dec. 12, 1950 |
| 2,541,498 | Calvert | Feb. 13, 1951 |
| 2,541,011 | Caldwell | Feb. 13, 1951 |
| 2,572,959 | Sparks et al. | Oct. 30, 1951 |
| 2,583,325 | D'Alelio | Jan. 22, 1952 |
| 2,632,752 | Anderson | Mar. 24, 1953 |
| 2,703,083 | Gross | Mar. 1, 1955 |
| 2,825,672 | Koblitz et al. | Mar. 4, 1958 |
| 2,859,200 | Lappala | Nov. 4, 1958 |

UNITED STATES PATENT OFFICE
CERTIFICATION OF CORRECTION

Patent No. 2,976,203                          March 21, 1961

Harold C. Young et al.

It is hereby certified that error appears in the above numbered patent requiring correction and that the said Letters Patent should read as corrected below.

Column 10, line 7, for the number "3" read -- 30 --.

Signed and sealed this 25th day of July 1961.

(SEAL)
Attest:

ERNEST W. SWIDER
Attesting Officer

DAVID L. LADD
Commissioner of Patents